United States Patent Office 2,759,022
Patented Aug. 14, 1956

2,759,022

MUSK ODORANT

Kurt Fuchs, Krefeld, Germany, assignor to Polak's Frutal Works, Inc.

No Drawing. Application November 21, 1951, Serial No. 257,655

Claims priority, application Netherlands August 27, 1951

3 Claims. (Cl. 260—592)

This invention relates to odoriferous materials having an odor resembling that of musk and of ambrette seed and to the synthesis of such materials.

Nitrobutylcymenes have been suggested as odoriferous materials having an odor resembling that of musk. These nitro compounds, however, have a number of objections among which may be mentioned they tend to decompose when exposed to light and they react with alkali. Hence, when they are used to impart odor to soaps or cosmetics, they cause objectionable discoloration thereof.

It is among the objects of this invention to provide an odoriferous material which is photochemically stable, to provide such material which has an odor resembling that of musk or ambrette seed, to provide such material which is inert to alkali, to provide such material which can be incorporated in soaps, cosmetics and other analogous materials without causing discoloration thereof and to provide processes for synthesizing such materials.

Other objects and advantages of this invention will be apparent from the following detailed description thereof.

I have found that odoriferous materials having an odor resembling that of musk or ambrette seed can be synthesized by reacting para-cymene with an alkyl halide, the alkyl group of which contains from 4 to 6 carbon atoms, aliphatic alcohol containing from 4 to 6 carbon atoms, or an alkene containing from 4 to 6 carbon atoms, isolating the resulting para-cymene reaction product and acetylating the isolated para-cymene reaction product.

The odoriferous materials embodying this invention show differences with respect to the intensity and the nuance of the musk odor, depending upon the particular reactants employed.

Compounds embodying this invention have a strong odor resembling that of musk and ambrette seed. They have good fixative properties, are photochemically stable and are inert to alkali. These properties are particularly important when the compounds are used for perfuming soaps and other detergents; because of these properties they do not cause discoloration of soaps and cosmetics in which they are incorporated. The compounds of this invention are also commercially important as components of perfume compositions suitable for the manufacture of lotions, creams, pharmaceutical products, and insecticides. For these uses they are greatly superior to the nitro musks heretofore employed. The nitro musks invariably impart to the soap, cosmetic and other compositions in which they are incorporated a yellow cast or color. The compounds of this invention, on the other hand, do not cause discoloration of the soaps, cosmetics and ther compositions in which they are used.

The invention is hereinafter described in greater detail chiefly in connection with the production of a nuclear acetylated tertiary amyl derivative of para-cymene, the preferred odoriferous material, but it will be understood the invention is not limited to this material or its production, but, as noted above, includes derivatives of para-cymene in which the group introduced into paracymene contains from 4 to 6 carbon atoms.

In the production of the odoriferous material the p-cymene is first reacted, as noted below, with a compound containing a tertiary amyl group and the resultant reaction product is subsequently ketonized by reaction with a suitable acetyl compound, such, for example, as acetyl chloride. The cymene may be reacted in the presence of aluminum chloride or ferric chloride with isoamyl-chloride or tertiary amyl-chloride or with other amyl halides than the chlorides, e. g., the bromides, iodides or fluorides. Alternatively, a mixture of the cymene and tertiary amyl-alcohol or tertiary amylene is condensed in the presence of an alkylation catalyst, e. g., sulfuric acid or zinc chloride, and the cymene reaction product formed in this way purified by fractional distillation.

The compound thus obtained is ketonized, for example, by treatment with acetyl chloride in the presence of aluminum chloride or other Friedel-Crafts catalyst.

The resultant compound has a very strong musk odor. Since it does not have any functional groups capable of reacting with alkali, it is inert to alkali and is therefore especially suited for perfuming soaps. It is much more soluble in ethyl alcohol and paraffin oils than the heretofore known nitro musks.

The introduction of primary butyl, amyl or hexyl groups by condensing the para-cymene with the corresponding alkyl chloride, alcohol or alkene may result in the production of isomers. To minimize the formation of such isomers it is preferred to condense the para-cymene in the presence of a Friedel-Crafts catalyst with the acyl halide corresponding to the primary butyl, amyl or hexyl group to be introduced and subsequently reducing the ketone thus formed, e. g., with zinc and hydrochloric acid according to the Clemmensen reduction or with hydrazine and alkali according to the Wolff-Kishner reduction.

In the first step of the process, the para-cymene is treated with a derivative containing one of the following alkyl radicals, normal pentyl, 3-methyl butyl, 2-methyl butyl, 2,2,2-trimethyl ethyl, methyl propyl carbinyl, diethyl carbinyl, methyl isopropyl carbinyl, dimethyl ethyl carbinyl, and primary, secondary, tertiary, straight chain and branched chain, butyl, hexyl and amyl groups.

As noted above the first step involves condensing paracymene with the appropriate alcohol or alkene in the presence of an alkylation catalyst, such as sulfuric acid or zinc chloride, or with the appropriate alkyl chloride in the presence of a Friedel-Crafts catalyst. Desirably, this condensation reaction employing an alkyl chloride is carried out at a temperature of —10° to 50° C., preferably 0° to 25° C. When utilizing an alcohol the temperature desirably is within the range of —20° to 50° C., preferably 0° to 20° C., and when employing an alkene the temperature may be within the range of 0° to 50° C. When following the procedure of condensing the cymene with an acyl halide a temperature of —10° to 70° C., preferably 30° to 60° C. may be used.

The cymene reaction product thus produced is acetylated, desirable at a temperature within the range of 0° to 60° C., preferably 10° to 30° C.

Both the first step and the acetylation reactions are carried out under atmospheric pressure conditions. When employing a Friedel-Crafts catalyst the reaction may be carried out under subatmospheric pressure, if desired. The reaction product of para-cymene and tertiary amyl derivatives give after acetylation a product having the most pronounced odor.

This invention, it will be understood, includes not only the individual reaction products in which the group introduced in the first step contains from 4 to 6 carbon atoms, but also mixtures of such para-cymenes, which mixtures may consist of a number of isomers of one or more of the compounds coming within the scope of this invention.

The following examples are given for purposes of illustration only; it will be understood the invention is not limited to these examples. In all of the examples the equipment used was a flask equipped with a thermometer, stirrer or agitator, a dropping funnel and a gas exhaust tube.

*Example I*

30 grams of anhydrous aluminum chloride suspended in 1000 grams of p-cymene are placed in the flask. While cooling the flask with ice water and agitating its contents 500 grams of tertiary amyl-chloride are slowly added. When hydrogen chloride evolution ceases the mixture is poured into cold water, the oil layer separated from the aqueous layer and the oil layer washed with water and then with dilute aqueous sodium hydroxide. The oil layer is then subjected to fractional distillation; a forerun consisting of unreacted cymene is first removed and thereafter the desired reaction product is removed. The latter distills over at about 240° to 250° C. at 760 mm. of mercury.

This reaction product is ketonized by dissolving while agitating 100 grams of it in 200 grams of carbon disulfide, adding 80 grams of anhydrous aluminum chloride or ferric chloride and then slowly adding through a dropping funnel 45 grams of acetyl chloride while cooling. When evolution of the hydrogen chloride ceases, ice water is added and the carbon disulfide distilled off preferably with steam. The ketone is then extracted from the reaction mixture using petroleum ether or benzene for this purpose. The resultant solution is then washed with water and the solvent removed by distillation under vacuum. A mixture of ketone isomers are thus obtained as a pale yellow liquid having a boiling point of 158°–159° C. at 7 mm. of mercury and a specific gravity of 0.985 at 15° C. This liquid crystallizes upon cooling, the crystalline mass having a melting point of 25° to 46° C. By re-crystallization the isomers can be separated, since they differ in their melting points. Also separation of the isomers can be effected by fractional distillation.

*Example II*

1000 grams of concentrated sulfuric acid are cooled to −10° C. in the flask. A mixture of 500 grams p-cymene and 120 grams of tertiary amyl alcohol are added to the sulfuric acid while vigorously stirring. This mixture is added over a 2 hour period, care being taken that the temperature of the mixture does not rise appreciably over 0° C. After completion of the addition of the p-cymene amyl alcohol mixture, the reaction mixture is stirred for a half hour and then poured on ice. The colorless oil layer is separated in a separatory funnel and washed with aqueous dilute sodium hydroxide and water until neutral. The neutral oil is then distilled under vacuum; a forerun of unreacted p-cymene is first distilled over followed by the desired reaction product as a colorless liquid boiling at a temperature of 103°C. at 7 mm. of mercury. Its density at 15° C. is 0.906–0.908.

The cymene reaction product may be converted into the ketone as follows:

400 grams of pure nitrobenzene and 140 grams of anhydrous aluminum chloride are agitated in a flask until complete dissolution takes place. The flask is cooled with water to maintain it at a temperature below 20° C. 200 grams of cymene reaction product and 85 grams of acetyl chloride are slowly added to the nitrobenzene-aluminum chloride mixture by means of the dropping funnel over a 3 hour period. During the reaction the temperature is kept at about 10° C. by cooling with water. When the gas evolution ceases the reaction mixture is stirred for an additional half hour. The thick liquid mass thus produced is poured into ice water while vigorously stirring and the stirring is continued while adding hydrochloric acid until the complex compound of the aluminum chloride is completely decomposed. The resultant heavy yellow oil is extracted with benzene and washed with water and sodium acetate solution until neutral. After distilling off the solvent 640 grams of a mixture of nitrobenzene with the ketone are obtained from which the nitrobenzene can easily be separated by repeated distillation under vacuum, since the boiling point of the nitrobenzene is about 70° C. at 5 mm. of mercury and that of the ketone is 140° C. at 5 mm. of mercury. In this way 390 grams of nitrobenzene are recovered and about 200 grams of pure ketone product are obtained. This ketone boils at a constant temperature and distills over practically without residue as a pale yellow colored liquid having a strong musk odor. This liquid can be crystallized and thus separated into the isomeric fractions of higher and lower melting point.

*Example III*

2000 grams of concentrated sulfuric acid are placed in the flask and cooled to 0° C. A mixture of 712 grams of p-cymene and 206 grams of methyl-isobutyl-carbinol are added drop-wise while vigorously stirring over a 5 hour period, care being taken that the temperature of the reaction mixture does not rise appreciably over 15° C. After completion of the addition the reaction mixture is stirred for a half hour more and then poured on ice. The colorless oil layer is separated in a separatory funnel and washed with dilute aqueous sodium hydroxide and water until neutral. The resultant liquid is distilled under vacuum. A forerun of unreacted p-cymene is distilled over first followed by the desired reaction product at a constant temperature of 95° C. at 1.5 mm. of mercury. This liquid is colorless and has a refractive index $N_D 20$ of 1.5035–1.5060. The introduction of the acetyl group and the isolation of the ketone takes place in the same manner as described in Example II above, except that 214 grams of cymene reaction product are used instead of 200 grams. About 160 grams of ketone are obtained. This ketone boils at a constant temperature of 140° C. at 2 mm. of mercury.

*Example IV*

1170 grams of nitrobenzene and 252 grams of finely powdered anhydrous aluminum chloride are stirred in the flask until complete dissolution of the aluminum chloride takes place. The flask is externally water cooled to maintain it at a temperature of not over 20° C. Through the dropping funnel a mixture of 254 grams p-cymene and 226 grams of n-iso-valeryl chloride is added over a 3 hour period while vigorously stirring the reaction mixture, the reaction temperature being kept at about 50° C. by externally cooling with water. When the gas evolution ceases the mixture is stirred for an additional half hour. The reaction mixture is then worked up as described in the second part of Example II. The p-cymene-isobutyl ketone thus obtained in a yield of about 200 grams boils at 111° C. at 2 mm. of mercury.

The conversion of the ketone into the corresponding n-iso-amyl-p-cymene can be effected, for example, by the Wolff-Kishner reduction as follows: in a flask equipped with a distillation head 41 grams of the ketone are mixed with 20 grams of hydrazine hydrate, 38 cc. of diethylene glycol and 1 cc. of glacial acetic acid. This mixture is heated for 45 minutes to a temperature of 180° C. thus distilling off all of the water. About 15 cc. of a mixture of water and hydrazine are obtained as distillate. The reaction mixture in the flask is cooled and 5.1 grams sodium methylate and 40 cc. of diethylene glycol are added. The mixture is then reheated to a temperature of 150° C. at which temperature the two layers previously present dissolve into each other. Upon continued heating to 220° C. the evolution of nitrogen begins. This evolution continues quietly for from 3 to 4 hours. Upon completion of the reaction, the reaction product is extracted with ether and washed with water until neutral. Thereafter the ether layer is distilled and after repeated distillation about 20 grams of n-iso-amyl-p-cymene is obtained. This material has a boiling point of 94° C. at 2 mm. of mercury and a refractive index $N_D20$ of 1.4910 to 1.4924.

The introduction of the acetyl group into the n-iso-amyl-p-cymene and the working up of the reaction product thus obtained are effected in the manner described in Example II, except that 200 grams of iso-amyl-cymene are used instead of 200 grams of tertiary amyl-cymene. About 100 grams of n-iso-amyl-p-cymene-methyl ketone are obtained having a boiling point of 110° C. at 0.3 mm. of mercury.

*Example V*

1000 grams of concentrated sulfuric acid are cooled in the reaction flask to a temperature of 0° C. A mixture of 500 grams of p-cymene and 102 grams of secondary butyl alcohol are added drop-wise with vigorous stirring over a 4 hour period, care being taken that the temperature of the mixture does not rise to over 10° C. After completion of the addition, the reaction mixture is stirred for an additional half hour and is then poured on ice. The colorless oil layer is separated in a separatory funnel and washed with dilute aqueous sodium hydroxide and water until neutral. It is then distilled under vacuum to distill over a forerun of unreacted p-cymene followed by the desired reaction product which is collected as a colorless liquid having a boiling point of 117° C. at 6 mm. of mercury.

The introduction of the acetyl group into this reaction product and the working up of the ketone are effected in the manner as described in Example II, except that 185 grams of reaction product are used instead of 200 grams of the reaction product of Example II. About 150 grams of ketone reaction product are obtained. The ketone boils at 128° C. at 5 mm. of mercury and has a refractive index $N_D20$ of 1.5128.

This invention may be used, for example, in making perfume compositions of the type used for perfuming white soap by mixing it with the following constituents in the proportions indicated:

100 g. of lavender oil
20 g. of spike oil
60 g. of cedar wood oil
30 g. of sandalwood oil
80 g. of patchouli oil
80 g. of oakmoss resinoid (colorless)
60 g. of iris resinoid
60 g. of geranium oil
100 g. of coumarin
260 g. of spike lavender oil
150 g. of reaction product of this invention made by condensing p-cymene with a compound containing a tertiary amyl group and acetylating the resultant reaction product.

A suitable oriental type of perfume employed for making lotions, perfumes and creams is made by mixing the following constituents in the proportions indicated:

150 g. of labdanum absolute (colorless)
80 g. of clary sage oil
50 g. of amyl salicylate
50 g. of sandalwood oil
10 g. of rose oil (essence absolute)
60 g. of civet tincture
100 g. of bergamot oil
50 g. of orange oil
50 g. of patchouli oil
50 g. of cedar wood oil
50 g. of ylang ylang oil
50 g. of iris resinoid
250 g. of reaction product of this invention made by condensing p-cymene with a compound containing a tertiary amyl group and acetylating the resultant reaction product.

It will be understood that the above represents two examples of formulas in which this invention may be employed and that the constituents of such formulas and the proportions in which they are mixed may be varied as desired.

It is further to be understood that this invention is not restricted to the present disclosure otherwise than as defined by the appended claims.

Having thus described my invention what I claim as new and desire to secure by Letters Patent is:

1. A photochemically stable para-cymene derivative having a musk odor and which is inert to alkali produced by reacting para-cymene with a compound from the group consisting of alkyl halides, the alkyl group of which contains from 4 to 6 carbon atoms, aliphatic alcohols containing from 4 to 6 carbon atoms and alkenes containing from 4 to 6 carbon atoms in the presence of a condensation catalyst, separating the para-cymene reaction product from the reaction mixture and acetylating the separated reaction product.

2. A photochemically stable para-cymene derivative having a musk odor and which is inert to alkali produced by reacting para-cymene with a compound from the group consisting of amyl halides, amyl alcohols and amylenes in the presence of a condensation catalyst, separating the para-cymene reaction product from the reaction mixture and acetylating the separated reaction product.

3. A photochemically stable para-cymene derivative having a musk odor and which is inert to alkali produced by reacting para-cymene with a compound from the group consisting of tertiary amyl alcohols and tertiary amylenes in the presence of a sulfuric acid catalyst, separating the para-cymene reaction product from the reaction mixture and acetylating the separated reaction product.

References Cited in the file of this patent

UNITED STATES PATENTS

| | | |
|---|---|---|
| 1,951,123 | Barbier | Mar. 13, 1934 |
| 2,004,069 | Bruson et al. | June 4, 1935 |
| 2,047,656 | Wirth | July 14, 1936 |
| 2,364,203 | Francis | Dec. 5, 1944 |
| 2,386,007 | Schmerling et al. | Oct. 2, 1945 |

OTHER REFERENCES

Barbier Helvetia Chim. Acta., vol. 15 (1932) pp. 592–596.

Malinovskii et al., Zhur. Obshchei Khim (J. Gen. Chem.), 19, 2088–93 (1949), abstracted in Chem. Abstracts, 44, 3939d (1950).